United States Patent
Heine

(10) Patent No.: US 9,871,747 B2
(45) Date of Patent: Jan. 16, 2018

(54) INTERFERENCE-IMMUNE TRANSMISSION OF DATA MESSAGES IN A COMMUNICATIONS NETWORK

(75) Inventor: Holger Heine, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 338 days.

(21) Appl. No.: 14/425,329

(22) PCT Filed: Sep. 3, 2012

(86) PCT No.: PCT/EP2012/067090
§ 371 (c)(1),
(2), (4) Date: Mar. 3, 2015

(87) PCT Pub. No.: WO2014/032736
PCT Pub. Date: Mar. 6, 2014

(65) Prior Publication Data
US 2015/0222568 A1    Aug. 6, 2015

(51) Int. Cl.
*H04L 12/28*     (2006.01)
*H04L 12/947*    (2013.01)
(Continued)

(52) U.S. Cl.
CPC .......... *H04L 49/25* (2013.01); *H04L 12/4625* (2013.01); *H04L 49/15* (2013.01); *H04L 45/24* (2013.01)

(58) Field of Classification Search
CPC ... H04L 43/10; H04L 12/40169; H04L 69/14; H04L 43/0817; H04L 67/10; H04L 29/08;
(Continued)

(56) References Cited

U.S. PATENT DOCUMENTS 7,035,281 B1    4/2006 Spearman et al.
7,301,949 B2   11/2007 Eriksson
(Continued)

FOREIGN PATENT DOCUMENTS

EP    2148473 A1    1/2010
EP    2242214 A2   10/2010
(Continued)

OTHER PUBLICATIONS

Kirrmann, H., et al.; "Seamless and low-cost redundancy for Substation Automation Systems (High availability Seamless Redundancy, HSR)"; Power and Energy Society General Meeting, IEEE, 2011; pp. 1-7, Jul. 24, 2011.
(Continued)

*Primary Examiner* — Hanh N Nguyen
(74) *Attorney, Agent, or Firm* — Laurence Greenberg; Werner Stemer; Ralph Locher

(57) ABSTRACT

A communications network includes a plurality of network components that are interconnected for exchanging data messages (data telegrams). The network has a first and a second partial network and each network component is connected to the two partial networks. In order to design such a communications network with few devices and so as to be as reliable as possible, the communications network has at least some network components that are interconnected along a chain. Each chain of network components has a first network component directly connected to the first partial network, and a second network component directly connected to the second partial network. A corresponding network component for operation in a communications network is also described, and a method for the interference-immune transmission of data messages in a communications network.

14 Claims, 3 Drawing Sheets

(51) Int. Cl.
*H04L 12/46* (2006.01)
*H04L 12/933* (2013.01)
*H04L 12/707* (2013.01)

(58) Field of Classification Search
CPC ......... H04L 12/26; H04L 49/25; H04L 49/15; H04L 12/947; H04L 12/933; H04L 41/12
See application file for complete search history.

(56) References Cited

U.S. PATENT DOCUMENTS

| | | | | |
|---|---|---|---|---|
| 7,876,764 | B2* | 1/2011 | Binetti | H04L 69/14 370/389 |
| 8,184,527 | B2* | 5/2012 | Ling | H04L 12/40169 370/216 |
| 8,582,424 | B2 | 11/2013 | Kirrmann | |
| 8,601,138 | B2 | 12/2013 | Chen et al. | |
| 8,730,834 | B2* | 5/2014 | Marusca | H04L 43/0817 370/254 |
| 2015/0281335 | A1* | 10/2015 | Heine | H04L 43/10 709/204 |

FOREIGN PATENT DOCUMENTS

| | | |
|---|---|---|
| RU | 2269873 C2 | 2/2006 |
| RU | 2373655 C2 | 11/2009 |
| RU | 2409904 C2 | 1/2011 |

OTHER PUBLICATIONS

Clemens, H.; "Seamless Communication Redundancy of IEC 62439"; Advanced Power System Automation and Protection (APAP).DOI:10. 11091/APAP.2011.6180451; IEEE; 2011; pp. 489-494, Oct. 16, 2011.

Siemens AG: International Standard IEC 62439-3, Industrial communication networks—High availability automation networks, Part 3: Parallel Redundancy Protocol (PRP) and High-availability Seamless Redundancy (HSR); Edition 2.0; Jul. 2012.

* cited by examiner

INTERFERENCE-IMMUNE TRANSMISSION OF DATA MESSAGES IN A COMMUNICATIONS NETWORK

BACKGROUND OF THE INVENTION

Field of the Invention:

The invention relates to a communications network having a plurality of network components which are connected to one another for the purpose of interchanging data messages, the communications network having a first subnetwork and a second subnetwork, and each network component being connected to both subnetworks. The invention also relates to a network component for operation in such a communications network and to a method for the interference-immune transmission of data messages in such a communications network.

Network components, that is to say network-enabled devices which can be connected to a communications network and can use the latter to interchange data by transmitting corresponding data messages, are used nowadays in many areas of technology, for example in the automation of installations. Network components are considered below to be both network-enabled terminals and those devices which are used to control and manage the transmission of data messages in the communications network, that is to say so-called "switches", "bridges", "hubs", "routers", for example.

Many installations operated in an automated manner require a high degree of failure safety. This requirement has severe effects on the communications network which is used to connect the network components of such an installation to one another. Therefore, such communications networks usually have a redundant design, that is to say the reliable transmission of data messages between the individual network components is ensured even when a communication link inside the communications network fails. The term "communication link" is intended to include below the entire transmission path between the respective network components, that is to say both an existing (wired or wireless) transmission medium and its physical, communication and logical connection to the respective network component (for example interfaces, communication devices, protocol stacks).

One example of the use of such a communications network which is to be designed to be failsafe is an automation installation in which network-enabled automation devices are connected to one another via the communications network for the purpose of interchanging data messages. Automation installations are used to automate systems, for example electrical energy supply networks or electrical switchgear, and usually comprise automation devices (for example so-called field devices) which are arranged in the vicinity of primary components of the corresponding installation, that is to say of the electrical energy supply network, for example. In the case of an electrical energy supply network, such primary components may be, for example, electrical cables and lines, transformers, generators, motors or converters. The automation devices may be, for example, so-called electrical protective devices or bay controllers which are installed in substations of electrical energy supply networks. In the terminology, such automation devices are often also referred to as so-called "IEDs" ("Intelligent Electronic Devices"). In this case, the automation devices are connected to the communications network and use the latter to interchange data messages which comprise, as useful data, control commands, messages relating to events (for example threshold value infringements), measured values or status messages, for example.

One possible way of making a communications network failsafe and in the process also ensuring largely seamless continued operation of the automation installation in the event of a fault in a communication link is described in the IEC 62439-3:2012 standard as the so-called "Parallel Redundancy Protocol" (PRP). In this case, seamless redundancy is achieved by virtue of the communications network having two subnetworks of any desired topology which are independent of one another and by virtue of each network component being connected to both subnetworks. Both subnetworks operate in the parallel mode, in which case, in order to transmit a data message, one network component sends the latter to the first subnetwork, on the one hand, and to the second subnetwork, on the other hand. The network component provided as the receiver of the data message receives both data messages from the subnetworks, in which case it uses the data message which arrives at it first and rejects the subsequently arriving data message as a duplicate. Since the two data messages use two transmission paths which are independent of one another in this case, it is ensured, even when there is a fault on one of the transmission paths, that the useful information transmitted with the data message reaches the receiver network component via the other—usually still intact—transmission path.

The use of a communications network constructed according to the PRP standard is known, for example, from the introductory part of the description of European patent application EP 2148473 A1.

The PRP standard makes it possible to use simply constructed network components with commercially available communication connections because no special requirements are imposed on the data communication control in this case. In contrast, the disadvantage of constructing a PRP communications network is the fact that PRP prescribes a strict parallel structure of the two subnetworks, as a result of which the amount of hardware needed to construct such a communications network, that is to say the number of required communication cables and switches for example, is considerably increased. The construction of a PRP communications network is consequently also associated with comparatively high costs for its infrastructure.

As an alternative solution for a PRP communications network, EP 2148473 A1 already mentioned proposes the use of a communications network according to the High-availability Seamless Redundancy (HSR) standard likewise described in IEC 62439-3:2012. An HSR communications network is constructed in a ring topology, in which case each network component is incorporated in the ring with two communication connections. One network component emits a data message in both directions of the ring and the receiver network component receives the data message arriving first and rejects the second as a duplicate. On account of the closed ring structure, there are always two communication paths which are independent of one another between all network components, with the result that the transmission of the data message is ensured, even in the case of a fault in one of the two communication paths, via the respective other transmission path.

A communications network constructed according to the HSR standard manages with a smaller number of cables and switches in comparison with the PRP standard but requires a comparatively large amount of management from the incorporated network components in order to control communication, in particular since data messages circling in the ring-shaped communications network must be detected and eliminated ("loop prevention"). The network components which can be used are therefore relatively expensive.

BRIEF SUMMARY OF THE INVENTION

The invention is therefore based on the object of specifying a possible way of redundantly transmitting data messages in a communications network, by means of which sufficient failure safety is ensured, on the one hand, and the amount of equipment and hardware—and therefore costs—needed to construct the communications network are reduced, on the other hand.

This object is achieved by means of a communications network of the type mentioned above, in which the communications network comprises at least some network components which are connected to one another in a chain-like manner, each chain of network components having a first network component, which is directly connected to the first subnetwork, and a second network component which is directly connected to the second subnetwork.

The connection of at least some network components to one another in the form of a chain makes it possible to considerably reduce the amount of effort needed to construct the two subnetworks. Whereas switches having a total of 120 communication connections must be provided in a conventional PRP network construction for 60 network components in the subnetworks, for example, the required communication interfaces can already be reduced to 40 in the case of a construction of the communications network according to the invention with a chain length of three network components. Even only 6 communication connections are required for a chain length of 20 network components. The reduction in the amount of effort required makes it possible to achieve a considerable hardware and cost saving. Since—in contrast to the ring structure of the HSR standard—there is also no need to detect circling messages with a construction in the form of a chain, network components having a relatively simple construction can also be used.

The invention is not restricted to all network components being arranged in chains. Chains of different length can likewise be used within the scope of the invention.

One advantageous embodiment of the communications network according to the invention provides for all network components to be set up, during the redundant transmission of data messages, to emit data messages both in the direction of the first subnetwork and in the direction of the second subnetwork, the emitted data messages being identical in terms of their useful data content and comprising a network qualifier which indicates that subnetwork in the direction of which the messages are emitted.

This makes it possible to transmit the data messages in a comparatively interference-immune manner by using the two independent subnetworks since, in the event of a fault in one of the subnetworks, the data message in question reaches the receiver network component via the intact, other subnetwork.

In this context, another advantageous embodiment of the communications network according to the invention may provide for the first network component in the chain of network components to be set up to transmit, to the first subnetwork, only those data messages whose network qualifier indicates the first subnetwork, and for the second network component in the chain of network components to be set up to transmit, to the second subnetwork, only those data messages whose network qualifier indicates the second subnetwork.

Implementation of this simple communication rule makes it possible to effectively prevent the occurrence of circling data messages since only those data messages which have the corresponding network qualifier are ever forwarded to the respective subnetwork. This makes it possible to dispense with complicated detection of circling data messages in the individual network components.

In this context, it is also considered to be an advantageous development of the communications network according to the invention if the network components are set up, when receiving data messages, to receive the first data message and to reject the second of two data messages which are addressed to them and are identical in terms of their useful data content.

This ensures that there can be no duplication of the received information. A duplicate can be detected, for example, using the MAC address of the sender network component of the data message and a unique sequence number contained in the data message.

Another advantageous embodiment of the communications network according to the invention also provides for any desired number of further network components to be arranged between the first network component and the second network component in a chain of network components.

Inserting as many network components as possible into the chains makes it possible to reduce the total number of required communication connections (ports) on the switches in the subnetworks and therefore to reduce the amount of hardware needed for the communications network.

Since, in the refinement of the communications network according to the invention, it is deliberately accepted that there is no redundant communication link for those network components which are arranged inside the same chain in favor of a smaller amount of hardware (and therefore also lower costs for the construction of the subnetworks), another advantageous embodiment of the communications network according to the invention provides for the network components to be arranged in the chains in such a manner that a number of direct transmissions of data messages between network components in the same chain is minimized.

In other words, in this embodiment, those network components which never or only rarely communicate with one another directly anyway are combined inside the same chain since redundancy when transmitting data messages is not absolutely required for such network components. However, the definitive decision as regards which network components are arranged inside the same chain on the basis of their direct communication behavior is incumbent upon the operator of the communications network; for example, those network components which, although rarely communicating with one another directly, do have to have important information interchanged between them when communication takes place should also not be arranged inside the same chain.

Alternatively or additionally, another advantageous embodiment of the communications network according to the invention may also provide for those network components between which the shortest transmission paths exist to be arranged in the same chain.

This makes it possible to further reduce the error susceptibility of the transmission paths, usually network cables, inside the same chain, with the result that this measure reduces the likelihood of a fault in one of the transmission paths inside a chain.

According to another advantageous embodiment of the communications network according to the invention, provision is also made for the network components to each have two communication connections which are used to connect them to the communications network.

Such network components having two communication connections or ports can be directly incorporated in the communications network since one of their ports can be used for indirect or direct connection to the first subnetwork and their further port can be used for indirect or direct connection to the second subnetwork. Such network components usually have an internal switch which is connected to the two communication connections.

Specifically, the invention can be used, for example, in such a communications network in which at least one of the network components is a network-enabled automation device of an automation installation.

For example, the automation installation may be an installation for controlling and/or monitoring an energy supply network, and the automation devices may be so-called IEDs ("Intelligent Electronic Devices"), for example electrical protective devices, measuring devices or bay controllers.

In order to be able to also incorporate those automation devices which have only one communication connection or port in the communications network in this context, another advantageous embodiment of the communications network according to the invention proposes that the communications network comprises at least one network-enabled automation device which has precisely one communication connection, this at least one automation device being connected to the communications network via one of the network components, and the network component in question having one communication connection for connection to the automation device and two communication connections for connection to the communications network.

In this case, the network component in question effectively provides a switch which has at least three communication connections and to which the two subnetworks are indirectly or directly connected, on the one hand, and to which the automation device is connected, on the other hand.

The above-mentioned object is also achieved by means of a network component for operation in a communications network according to one of the embodiments described above, the communications network comprising a first subnetwork and a second subnetwork, and the network component having two communication connections for connection to the communications network.

With respect to the network component, the invention provides for the network component to be set up to be directly connected to one of the subnetworks using one of the two communication connections and to be connected to another network component using the other of the two communication connections, and for the network component to be set up to transmit only those data messages which comprise a network qualifier indicating the corresponding subnetwork using the communication connection which can be connected to the subnetwork.

Since the network component is directly connected to one of the two subnetworks only on one side, chains of at least two network components are consequently formed in this case. The simple rule whereby the network components each transmit only those data messages with an appropriate network qualifier to the directly connected subnetwork makes it possible to effectively prevent the occurrence of circling messages.

In order to make the parameterization of the network components as simple as possible with regard to the use of their communication connections, it is proposed that the network component has a detection device which is set up, after connection to the communications network, to detect which of the two communication connections is connected to the subnetwork and which is connected to another network component.

Specifically, provision may also be made, for example, for the network component to be an automation device for use in an automation installation.

Another embodiment of the network component according to the invention also provides for the network component to have one communication connection for connection to at least one automation device having a single communication connection and to have two communication connections for connection to the communications network.

In this case, the network component forms a connection device for an automation device having only one communication connection, with the result that such an automation device can also be incorporated in a corresponding communications network.

The above-mentioned object is finally also achieved by means of a method for the interference-immune transmission of data messages in a communications network, the communications network having a plurality of network components and a first subnetwork and a second subnetwork, each network component being connected to both subnetworks, and, for the purpose of redundantly transmitting a data message from one network component to a further network component, the first network component emitting data messages both in the direction of the first subnetwork and in the direction of the second subnetwork, and the emitted data messages being identical in terms of their useful data content and comprising a network qualifier which indicates that subnetwork in the direction of which the messages are emitted, and the further network component receiving the first data message which arrives at it and rejecting the second.

With respect to the method, the invention provides for the communications network to comprise at least some network components which are connected to one another in a chain-like manner, each chain of network components having a first network component, which is directly connected to the first subnetwork, and a second network component which is directly connected to the second subnetwork, the first network component in the chain of network components transmitting, to the first subnetwork, only those data messages whose network qualifier indicates the first subnetwork, and the second network component in the chain of network components transmitting, to the second subnetwork, only those data messages whose network qualifier indicates the second subnetwork.

With respect to the advantages of the method according to the invention, reference is made to the statements made above with respect to the communications network according to the invention.

BRIEF DESCRIPTION OF THE SEVERAL VIEWS OF THE DRAWING

The invention is explained in more detail below using exemplary embodiments. In the drawings.

DESCRIPTION OF THE INVENTION

Figure 1:
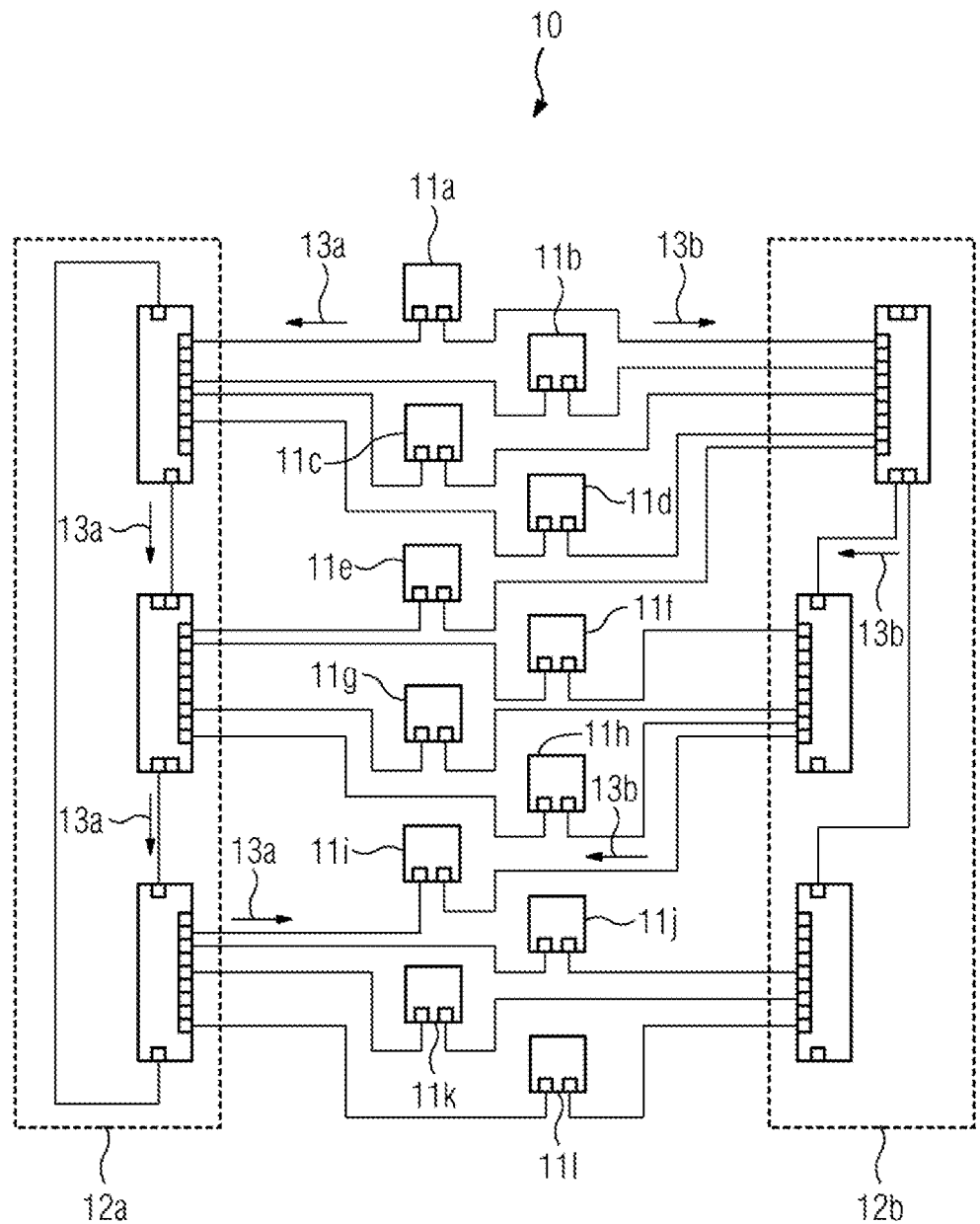
FIG. 1 shows a communications network according to IEC 62439-3:2012 (PRP) according to the prior art.

FIG. 1 shows, by way of example, the construction of a communications network 10 according to the IEC 62439-3:2012 (PRP) standard according to the prior art, for example in the form of an Ethernet communications network. The communications network 10 is used to redundantly couple network components 11a-1 which interchange data messages with one another. The network components 11a-1 may be, for example, automation devices of an automation installation, for example an energy automation installation for controlling and/or monitoring an electrical energy supply network.

In order to ensure redundant and interference-immune transmission of the data messages between the network components 11a-1, the communications network 10 has two subnetworks 12a and 12b which are independent of one another and are operated in a parallel manner. The two subnetworks 12a and 12b correspond in terms of their communication protocols used at the MAC-LLC level (MAC=Media Access control; LLC=Logical Link Control) but may differ entirely in terms of their performance and topology; the first subnetwork 12a is constructed in a ring structure only by way of example in FIG. 1, whereas the second subnetwork 12b has a tree structure. There is no direct connection between the two subnetworks 12a and 12b, with the result that data messages from the first subnetwork 12a cannot reach the other subnetwork 12b and vice versa. For this purpose, the rule whereby no data messages from one communication connection can be forwarded to the other communication connection is implemented in the network components (a bridge functionality, for example according to the IEEE 802.1D standard, is therefore deactivated). Each of the network components 11a-1 is directly connected to the two subnetworks 12a and 12b via separate communication connections or ports using communication links with full duplex capability, for example network cables.

For the interference-immune and redundant transmission of data messages in the communications network 10, a transmitter network component, for example the network component 11a, transmits an item of information to a receiver network component, for example the network component 11i. The information to be transmitted is embedded, as useful data content, in two data messages 13a and 13b which correspond in terms of the useful data content. Specifically, the network component 11a emits the first data message 13a in the direction of the first subnetwork 12a, while it emits the second data message 13b in the direction of the second subnetwork 12b. The data messages 13a and 13b are indicated in FIG. 1 by block arrows starting from the network component 11a.

The data messages 13a and 13b are transmitted to the receiver network component 11i independently of one another via the two subnetworks 12a and 12b. The receiver network component receives the data messages and uses the information contained in the useful data content of the data message arriving first (for example data message 13b), while the data message arriving later (for example data message 13a) is rejected as a duplicate. The duplicate can be detected, for example, using details of the MAC address of the transmitter network component 11a, which are contained in the respective data message 13a or 13b, and a unique sequence number.

The communications network 10 illustrated in FIG. 1 allows interference-immune and redundant transmission of data messages between all network components 11a-1 since, even in the event of a fault in a transmission path, for example in the event of a defect in a communication connection of a network component or a cable break inside one of the two subnetworks 12a or 12b, the respective other data message is transmitted via the intact transmission path. However, the interference immunity is paid for with a comparatively large amount of hardware. In the example in FIG. 1, a total of 24 (2 subnetworks×12 network components) communication connections of switches are accordingly required in the subnetworks 12a and 12b in order to redundantly connect 12 network components 12a-1 to the two subnetworks 12a, 12b. Since switches, in particular "hardened" switches which are suitable for use in often adverse environmental conditions in automation installations (for example very high or very low temperatures, high humidity, strong EMC influences), are comparatively expensive, the network infrastructure shown in FIG. 1 gives rise to relatively high costs.

Figure 2:
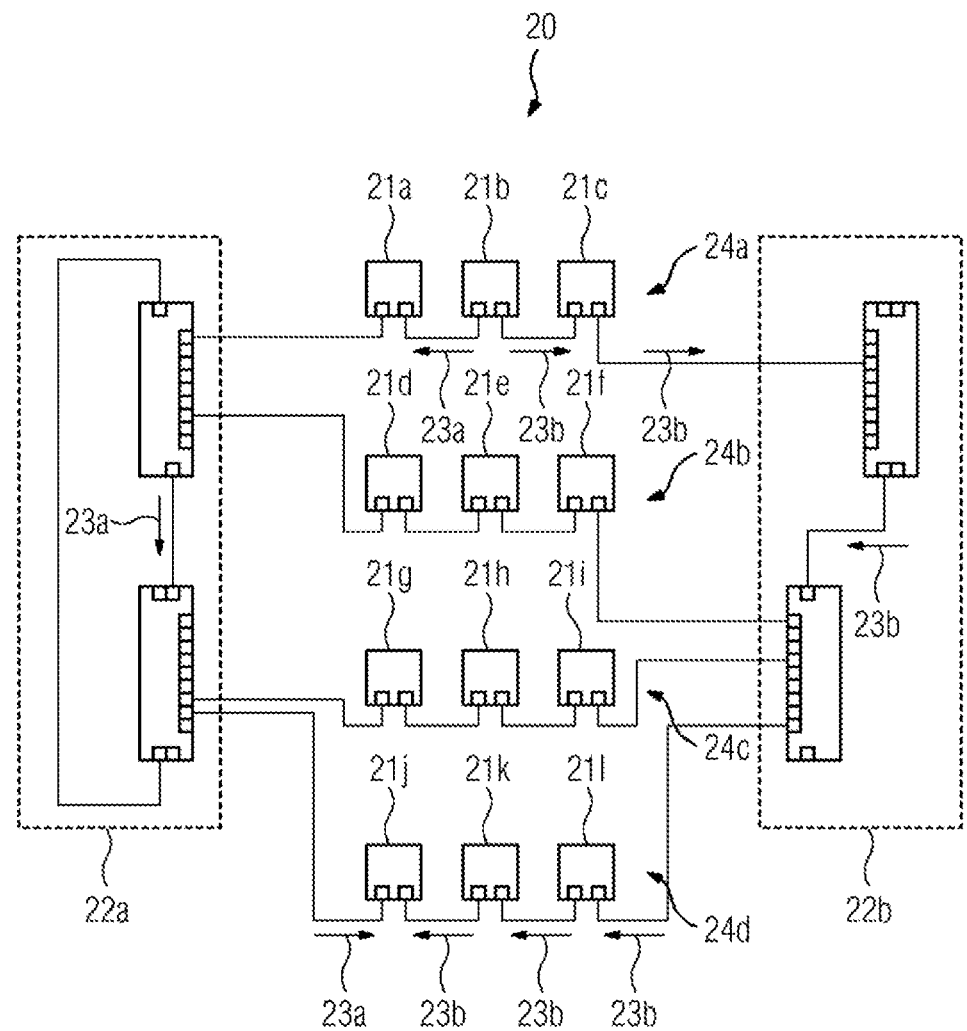
FIG. 2 shows a first exemplary embodiment of a communications network with a reduced amount of hardware.

FIG. 2 shows an exemplary embodiment of a communications network 20 having a reduced amount of hardware in comparison with the communications network 10 in FIG. 1 and therefore also lower costs for the network infrastructure.

The communications network 20 takes account of the fact that the same high degree of redundancy and interference immunity is often not required for all communication links in a communications network. In this respect, although the communications network 20 also has two subnetworks 22a and 22b which are operated independently of one another, the network components 21a-1 are arranged here in chains 24a-d of three network components each.

Specifically, the network components 21a-c, for example, are arranged in a chain 24a in such a manner that a first network component 21a is directly connected to the first subnetwork 22a using one communication connection and is directly connected to a communication connection of a middle network component 21b using the other communication connection. The middle network component 21b is directly connected to a communication connection of a second network component 21c using its other communication connection, which second network component is directly connected to the second subnetwork 22b using its other communication connection.

Therefore, although each network component 21a-c is still connected to both subnetworks 22a and 22b, indirect connections are also allowed in the communications network 20 in contrast to the communications network 10 according to FIG. 1. For example, the network component 21b is connected to the first subnetwork 22a only indirectly, namely via the network component 21a.

The other network components 21d-1 are arranged in the chains 24b-d in a corresponding manner. Combining at least some network components to form chains makes it possible to drastically reduce the number of communication connections to be provided by the switches in the subnetworks 22a and 22b. It is seen in the example in FIG. 2 that combining in each case three network components to form chains makes it possible to dispense with two thirds of the communication connections in the subnetworks in comparison with the communications network 10 shown in FIG. 1 (only 8 required communication connections instead of 24 as in FIG. 1).

The procedure when transmitting an item of information from a transmitter network component (for example network component 21b) to a receiver network component (for example network component 21j) is described below using an example.

The network component 21b embeds the information to be transmitted to the network component 21j in two data messages 23a and 23b which are identical in terms of their useful data content but differ as a result of a different network qualifier. The latter indicates which subnetwork 22a or 22b is used to transmit the respective data message 23a or 23b. Specifically, the data message 23a consequently contains a network qualifier indicating the subnetwork 22a and is accordingly first of all transmitted from the network component 21b to the network component 21a adjacent to it in the chain 24a and is forwarded from the network component 21a to the first subnetwork 22a. In a corresponding manner, the second data message 23b comprises a network qualifier indicating the second subnetwork 22b and is first of all transmitted to the adjacent network component 21c and is forwarded from the latter to the second subnetwork 22b.

The first data message 23a is transmitted, via the first subnetwork 22a, to the fourth chain 24d and there passes directly to the first network component 21j in the chain 24d. In a corresponding manner, the second subnetwork 22b forwards the second data message 23b to the fourth chain 24d. There, the second data message 23b finally passes, via the network components 21l and 21k, to the receiver network component 21j. The network component 21j uses the information contained in the useful data content of the data message arriving first and rejects the data message which arrives later. The duplicate can also be detected in the communications network 20 according to FIG. 2, for example, using details of the MAC address of the transmitter network component 21b, which are contained in the respective data message 23a or 23b, and a unique sequence number.

In order to properly carry out the procedure explained above when transmitting data messages, the following communication rules are implemented in the network components 21a-1 in a chain 24a-d:

Marginal network components, that is to say network components which are connected to one subnetwork, on the one hand, and are connected to another network component (for example the first network component 21a and the second network component 21c in the first chain 24a), on the other hand, forward, according to a first communication rule, all data messages directly received by them from one of the subnetworks 22a or 22b to the network component itself (for example for the separate use of an item of information contained in the data message at an application level of the network component) and to the other communication connection to which the other network component is connected. For example, the first network component 21a, as the marginal network component in the first chain 24a, therefore forwards all data messages arriving from the first subnetwork 22a to its own application level and to the further communication connection to which the middle network component 21b is connected.

According to a second communication rule, marginal network components transmit all data messages which they themselves have generated, with consideration of the network qualifier, in the direction of the subnetworks 22a and 22b via both communication connections. For example, the network component 21a emits a data message containing a network qualifier indicating the first subnetwork 22a in the direction of the first subnetwork 22a via one communication connection, while it emits a second data message containing a network qualifier indicating the second subnetwork 22b in the direction of the second subnetwork 22b via the other communication connection.

According to a third communication rule, marginal network components forward only those data messages which are received at their communication connection connected to the other network component to the network component itself (for example its application level). However, the data messages are also forwarded to the subnetwork only when they have a network qualifier indicating the subnetwork in question; data messages having an unsuitable network qualifier are consequently not forwarded, but rather are blocked. This effectively avoids the occurrence of circling data messages which would increase the communication load on the communications network. For example, the first network component 21a in the first chain 24a forwards all data messages arriving at its communication connection connected to the network component 21b to its application level. However, forwarding to the first subnetwork 22a via the other communication connection is carried out only when the network qualifier of the data message in question actually indicates the first subnetwork 22a. If this is not the case, the first network component 21a blocks the forwarding of the data message to the first subnetwork.

The communication rules explained below are implemented in middle network components, that is to say those network components which are arranged inside a chain and are directly connected to other network components (and not to one of the subnetworks 22a or 22b) using both communication connections.

According to a first communication rule, the middle network components forward all data messages arriving at one of their communication connections to the network component itself (for example for use at an application level of the network component) and to the respective other communication connection for transmission to another network component connected thereto. For example, the network component 21b forwards all data messages arriving at its communication connection connected to the network component 21a to its application level and also transmits them to the network component 21c via its other communication connection.

According to a second communication rule, middle network components transmit all data messages which they themselves have generated, with consideration of the network qualifier, in the direction of the subnetworks 22a and 22b via both communication connections. For example, the network component 21b emits a data message containing a network qualifier indicating the first subnetwork 22a in the direction of the first subnetwork 22a via one communication connection, while it emits a second data message containing a network qualifier indicating the second subnetwork 22b in the direction of the second subnetwork 22b via the other communication connection.

Since the communication rules which need to be used consequently depend on the role of the network component in the chain (marginal or middle network component), the information relating to this role must be stipulated in the devices in a parameter setting. This can be carried out either manually when constructing the communications network or automatically. For the latter alternative, the network components have a detection device which can be integrated, for example, in a communication controller which is present anyway. This detection device uses a special communication protocol in order to retrieve information from the devices adjacent to the respective network component. If the adjacent devices are other network components in both cases, the role of a middle network component is allocated to the network component to be parameterized. In contrast, if the detection device detects another network component only at one communication connection of the network component and detects a switch of one of the subnetworks 22a or 22b at the other communication connection, the role of a marginal network component is allocated to the network component to be parameterized. The detection device can use the "Link Layer Discovery Protocol" (LLDP) according to IEEE 802.1AB, for example, to query the respective adjacent devices.

As already mentioned further above, the same degree of redundancy and interference immunity as in a communications network in which each network component is directly connected to both subnetworks does not exist for each network component in a communications network in which at least some of the network components are combined to form chains (for example communications network 20 according to FIG. 2). This is because there is no redundancy for transmitting data messages between network components which are arranged inside the same chain since only one transmission path (namely the transmission path via the respective chain itself) exists in this case. The second transmission path is obstructed for such network components on the basis of the communication rule for marginal network components, which only allows data messages with an appropriate network qualifier to be transmitted to a respective subnetwork. In contrast, there is still a high degree of redundancy and interference immunity for network components in different chains since two independent transmission paths are respectively present in this case.

For example, the network component 21a can communicate with the network component 21c only by means of a data message which is transmitted inside the chain (that is to say via the network component 21b); in contrast, the other conceivable transmission path, namely from the network component 21a to the network component 21c via the first subnetwork 22a, another chain (for example chain 24b) and the second subnetwork 22b, is blocked. This is due to the fact that the data message in question, on account of its transmission from the network component 21a to the first subnetwork, contains a network qualifier indicating this first subnetwork 22a, which network qualifier, however, does not allow the data message to be transmitted to the second subnetwork 22b. Consequently, on account of the corresponding communication rule for marginal network components, the data message would be prevented from being forwarded from the network components 21f, 21i and 21l to the second subnetwork on account of the unsuitable network qualifier. If there is therefore a cable break in the communication link between the network components 21a and 21b, for example, there is no longer a valid transmission path between the network components in the first chain 24a.

In contrast, there are two respective independent transmission paths for transmitting a data message between the network component 21 and any other desired network component outside the chain 24a since no data messages with an unsuitable network qualifier would have to be transmitted in the subnetworks in this case.

Since, as explained, the transmission of data messages inside a chain does not have any redundancy, corresponding measures for retaining a high degree of interference immunity of the entire communications network should be taken.

For this purpose, provision may first of all be made for the communication links between the network components in a common chain to be connected only using comparatively short and high-quality communication media (for example short network cables) and for the communication media to be laid in a manner which is as immune as possible to external influences (for example in cable ducts). In addition, when constructing the communications network, account can be taken of which network components must interchange data messages directly with one another more frequently and which must interchange data messages directly with one another more rarely or even never. If only those network components which must communicate with one another rarely or never are combined in the chains, the lack of transmission redundancy between these components is not a disadvantage (or is only an acceptable disadvantage). Therefore, when selecting the network components which are to be combined in the respective chains, care should be taken to ensure that the likely direct data traffic inside the chains (that is to say the transmitter and receiver of a data message are in the same chain) is minimized as far as possible.

Figure 3:
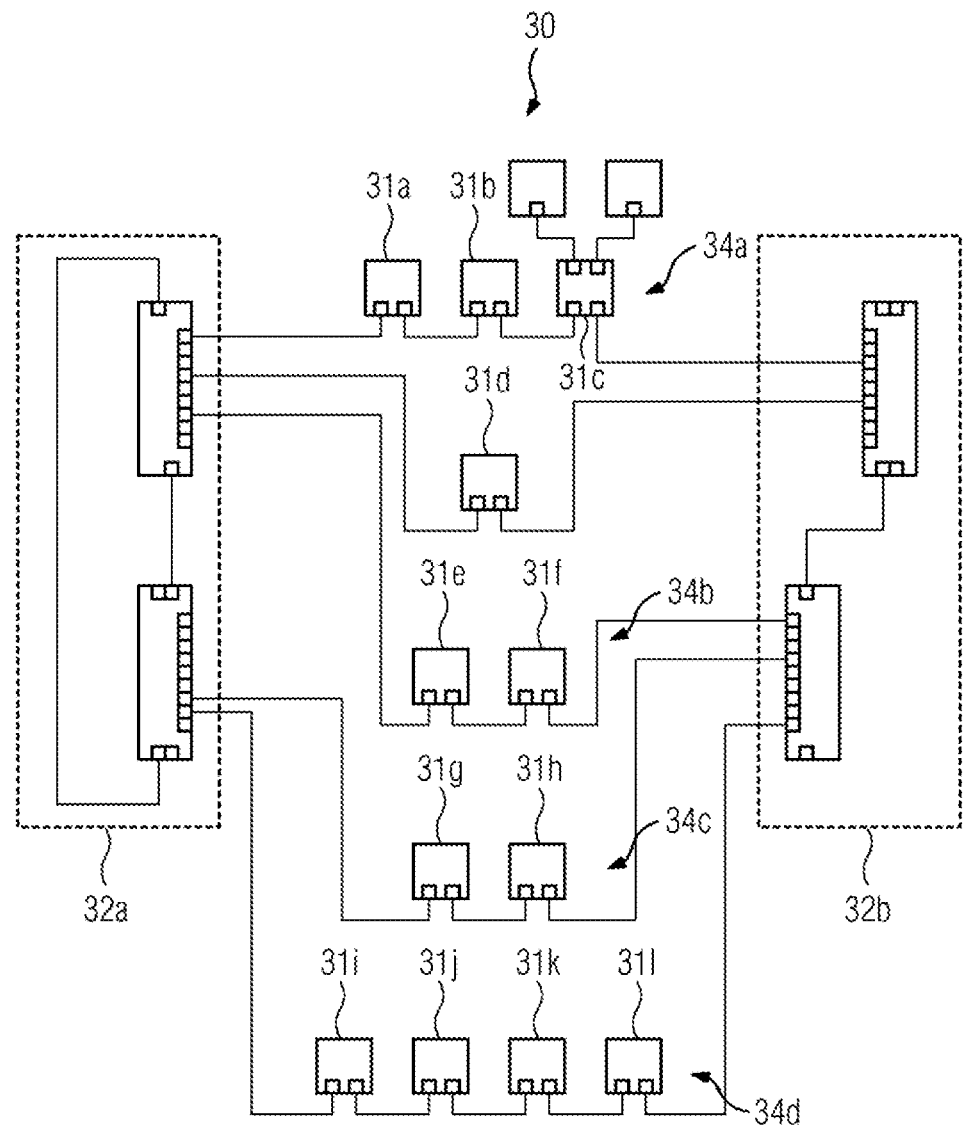
FIG. 3 shows a second exemplary embodiment of a communications network with a reduced amount of hardware.

FIG. 3 finally shows a second exemplary embodiment of a communications network with a comparatively small amount of hardware.

FIG. 3 shows a communications network 30 having a plurality of network components 31a-1 and two subnetworks 32a and 32b. The method of transmitting data messages corresponds largely to the method already explained with respect to FIG. 2 and therefore only the differences from the exemplary embodiment according to FIG. 2 are discussed below.

In FIG. 3, the network components are also arranged in four chains 34a-d, but, unlike the communications network 20 in FIG. 2, the chains 34a-d have different lengths, that is to say different numbers of network components. Specifically, the first chain 34a comprises three network components 31a-c, the second and third chains 34b and 34c each comprise two network components 31e-f and 31g-h and the fourth chain 34d comprises four network components 31i-1. Like in a conventional PRP communications network, the network component 31d is directly connected to both subnetworks 32a and 32b and is consequently not arranged in one of the chains 34a-d. It is seen that the subnetworks 32a and 32b must provide a somewhat increased number of communication connections (namely a total of 10) in comparison with the example according to FIG. 2.

Whereas the network components 31a-b and 31d-1 may be, for example, automation devices each having two communication connections for incorporation in the communications network 30, those terminals which have only one communication connection can also be incorporated in the communications network 30 via the network component 31c. For this purpose, the network component 31c has, on the one hand, two communication connections for connection to the communications network 30 and, on the other hand, at least one communication connection (in the present example: two communication connections) for connection to the respective terminal having only one communication connection. The network component 31c therefore effectively provides a connection device for those terminals having only one communication connection and ensures that they are redundantly incorporated in the communications network according to the communication rules for network components explained above with respect to FIG. 2.

The invention claimed is:

1. A communications network, comprising:
   a first subnetwork and a second subnetwork;
   a plurality of network components connected to one another for interchanging data messages, each of said network components being connected to said first subnetwork and to said second subnetwork;
   at least some of said network components being connected to one another in a chain, with each said chain of network components having a first network component directly connected to said first subnetwork and a second network component directly connected to said second subnetwork;
   wherein, during a redundant transmission of data messages, all of said network components are configured to emit data messages in a direction of said first subnetwork and in a direction of said second subnetwork, the emitted data messages being identical in terms of a useful data content thereof and including a network qualifier that indicates the respective said subnetwork in the direction of which the messages are emitted.

2. The communications network according to claim 1, wherein:
   said first network component in the chain of network components is configured to transmit, to said first subnetwork, only those data messages whose network qualifier indicates said first subnetwork; and
   said second network component in the chain of network components is configured to transmit, to said second subnetwork, only those data messages whose network qualifier indicates said second subnetwork.

3. The communications network according to claim 1, wherein said network components are configured, when receiving data messages, to receive a first data message and to reject a second of two data messages that are addressed to the respective said network component and that are identical in terms of the useful data content thereof.

4. The communications network according to claim 1, wherein any desired number of further network components are arranged between said first network component and said second network component in a chain of network components.

5. The communications network according to claim 1, wherein said network components are arranged in the chains such that a number of direct transmissions of data messages between network components in the same chain is minimized.

6. The communications network according to claim 1, wherein those network components between which a shortest transmission paths exists are arranged in the same chain.

7. The communications network according to claim 1, wherein each of said network components has two communication connections for connecting to the communications network.

8. The communications network according to claim 7, wherein at least one of said network components is a network-enabled automation device of an automation installation.

9. The communications network according to claim 7, comprising:
   at least one network-enabled automation device having precisely one communication connection, said at least one automation device being connected in the communications network via one of said network components; and
   said one of said network components having one communication connection for connection to said at least one automation device and two communication connections for connection to the communications network.

10. A network component for operation in a communications network having a first subnetwork and a second subnetwork, the network component comprising:
    two communication connections for connection to the communications network;
    the network component being configured to be directly connected to one of the subnetworks of the communications network using one of said two communication connections and to be connected to another network component using the other of said two communication connections; and
    the network component being configured to transmit only those data messages via the communication connection that can be connected to the subnetwork which comprise a network qualifier indicating the respectively corresponding subnetwork.

11. The network component according to claim 10, further comprising a detection device configured, after connection to the communications network to detect which of said two communication connections is connected to the subnetwork and which is connected to another network component.

12. The network component according to claim 10, being an automation device for use in an automation installation.

13. The network component according to claim 10, comprising one communication connection for connection to at least one automation device having a single communication connection and two communication connections for connection to the communications network.

14. A method for an interference-immune transmission of data messages in a communications network, the communications network having a plurality of network components, a first subnetwork and a second subnetwork network component being connected to both subnetworks, the method comprising:
    transmitting a data message from one transmitting network component to a further network component, the transmitting network component emitting data messages in a direction of the first subnetwork and in a direction of the second subnetwork, the emitted data messages being identical in terms of a useful data content thereof and including a network qualifier that indicates the respective subnetwork in the direction of which the messages are emitted;
    receiving with the receiving network component the first data message arriving at the receiving network component and rejecting the second arriving data message;
    the communications network including at least some network components connected to one another in a chain, with each chain of network components having a first network component, which is directly connected to the first subnetwork, and a second network component, which is directly connected to the second subnetwork;
    transmitting from the first network component in the chain of network components to the first subnetwork, only those data messages whose network qualifier indicates the first subnetwork; and
    transmitting from the second network component in the chain of network components to the second subnetwork, only those data messages whose network qualifier indicates the second subnetwork.

* * * * *